Joseph John's Corn Planter
71493
PATENTED
NOV 26 1867
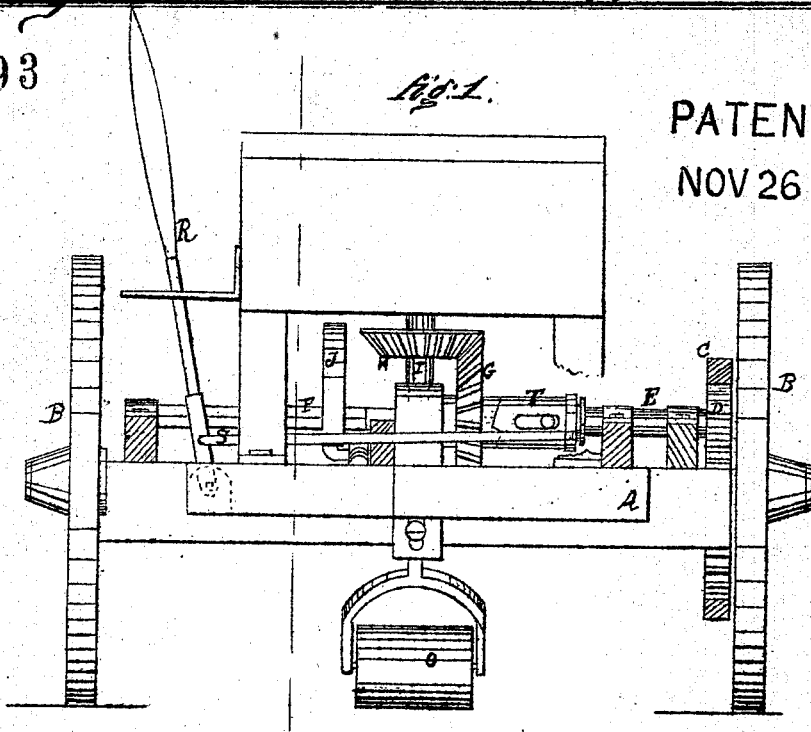
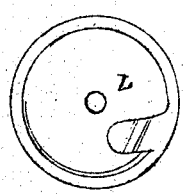
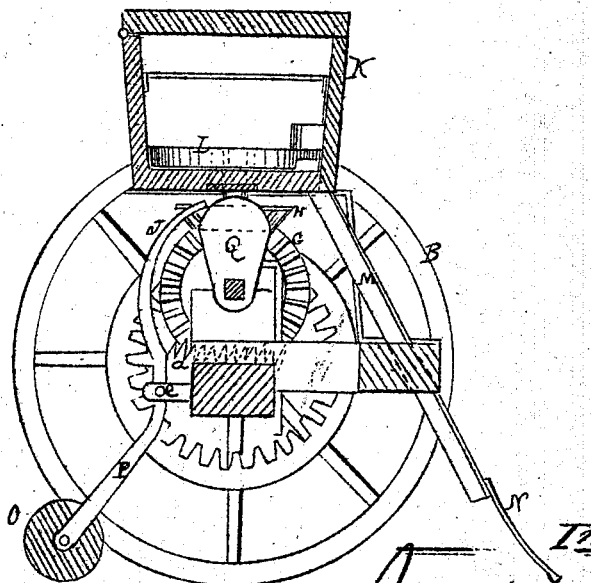
Witnesses
Inventor
Joseph John
per
Alexander & Mason

United States Patent Office.

JOSEPH JOHN, OF MASSILLON, OHIO.

Letters Patent No. 71,493, dated November 26, 1867.

---

IMPROVEMENT IN CORN-PLANTERS.

---

The Schedule referred to in these Letters Patent and making part of the same.

---

TO ALL WHOM IT MAY CONCERN:

Be it known that I, JOSEPH JOHN, of Massillon, in the county of Stark, and in the State of Ohio, have invented certain new and useful Improvements in Corn-Planters; and do hereby declare that the following is a full, clear, and exact description thereof, reference being had to the accompanying drawings, and to the letters of reference marked thereon.

In the annexed drawings, making part of this specification, A represents the frame of the machine, which is provided with two short axles, upon which are placed the wheels B B, which support and carry it. Lying crosswise of the frame, and between the wheels B B, are two shafts, E and F, which have suitable bearings, and whose inner ends lie close together, so that they can be connected, when desirable, by means of a sliding clutch, T. Secured to the inner face of one of the wheels B is a rim-wheel, C, with cogs on its inner periphery. The outer end of shaft E has upon it a pinion, D, which gears into the wheel C. The shaft E is also provided with the clutch T, which serves to unite the two shafts. This clutch is operated by means of the lever R and rod S. Secured upon the shaft F is a bevelled gear-wheel, G, and a cam-block, Q. The wheel G gears into a bevel-wheel, H, which is secured upon the vertical shaft I. This shaft I passes through the bottom of the seed-hopper K, and has secured upon its upper end a seeding-wheel, L. The wheel L lies upon the bottom of the hopper, in a horizontal position, and has a seed-aperture on its under side, which connects, as it revolves, with a spout, M. As the wheel L revolves, it collects the required amount of corn to be discharged into one hill, and, as its aperture passes over the spout M, the corn falls into said spout, and is carried to the furrow, which is opened or formed by the shovel N on the lower end of the spout. O represents a roller, which has its bearings in the lower end of a forked bar, P. This bar P is pivoted to the back part of the frame, at e. The upper end, J, of this bar is curved, as seen, and stands in such position as to be operated upon by the cam-block Q. a represents a spring, which draws the bar P above its pivot, toward the block Q, and thus raises the roller above the furrow. When the block Q operates upon the end J, throwing it outward from its shaft, the roller O is made to strike the earth and cover the corn which has been deposited in front of it through spout M. The driver has his seat upon the hopper K.

Having thus fully described my invention, what I claim, is—

1. The arrangement of the shafts E and F, clutch T, wheels G and H, shaft I, wheel L, and spout M, in the manner and for the purpose set forth.

2. The arrangement of the cam-block Q with the bar P, roller O, and spring a, as and for the purpose set forth.

In testimony that I claim the foregoing I have hereunto set my hand and seal, this 2d day of October, 1867.

JOSEPH JOHN. [SEAL.]

Witnesses:
MATTHIAS ERTLY,
GEORGE FRAUHOLTZ.